(12) United States Patent
Mguni et al.

(10) Patent No.: US 12,699,909 B2
(45) Date of Patent: Aug. 4, 2026

(54) NON-ZERO-SUM GAME SYSTEM FRAMEWORK WITH TRACTABLE NASH EQUILIBRIUM SOLUTION

(71) Applicant: Huawei Technologies Co., Ltd., Shenzhen (CN)

(72) Inventors: David Mguni, London (GB); Yaodong Yang, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 991 days.

(21) Appl. No.: 17/568,493

(22) Filed: Jan. 4, 2022

(65) Prior Publication Data

US 2022/0147847 A1 May 12, 2022

Related U.S. Application Data

(63) Continuation of application No. PCT/EP2020/065456, filed on Jun. 4, 2020.

(51) Int. Cl.
| | |
|---|---|
| *G06N 5/043* | (2023.01) |
| *G06N 7/01* | (2023.01) |
| *G06N 20/00* | (2019.01) |

(52) U.S. Cl.
CPC .............. *G06N 5/043* (2013.01); *G06N 7/01* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 6,961,678 | B2 | 11/2005 | Feldman |
| 8,014,809 | B2 | 9/2011 | Bar-Ness et al. |

(Continued)

FOREIGN PATENT DOCUMENTS

| | | |
|---|---|---|
| CN | 101296190 B | 8/2010 |
| CN | 102413473 A | 4/2012 |

(Continued)

OTHER PUBLICATIONS

Liang et al., "A Multi-agent Reinforcement Learning based Routing Protocol for Wireless Sensor Networks," in IEEE Int'l Symp. Wireless Comm. Sys. 552-57 (2008). (Year: 2008).*

(Continued)

*Primary Examiner* — Ryan C Vaughn
(74) *Attorney, Agent, or Firm* — Leydig, Voit & Mayer, Ltd.

(57) ABSTRACT

A computer-implemented device and corresponding method are provided for processing a multi-agent system input to form an at least partially optimised output indicative of an action policy. The method comprises receiving the multi-agent system input, the multi-agent system input comprising a definition of a multi-agent system and defining behaviour patterns of a plurality of agents based on system states; receiving an indication of an input system state; performing an iterative machine learning process to estimate a single aggregate function representing the behaviour patterns of the plurality of agents over a set of system states; and iteratively processing the single aggregate function for the input system state to estimate an at least partially optimised set of actions for each of the plurality of agents in the input system state. This may allow policies corresponding to the Nash equilibrium to be learned.

20 Claims, 9 Drawing Sheets

(56) References Cited

U.S. PATENT DOCUMENTS

| | | | | |
|---|---|---|---|---|
| 9,828,107 | B1 * | 11/2017 | Ruymgaart | G05D 1/0077 |
| 2020/0090071 | A1 * | 3/2020 | Franzke | G06F 17/18 |
| 2020/0090074 | A1 | 3/2020 | Isele et al. | |
| 2020/0151576 | A1 * | 5/2020 | Gajewski | G06N 3/086 |
| 2021/0374574 | A1 * | 12/2021 | Osogami | G06F 17/18 |

FOREIGN PATENT DOCUMENTS

| | | |
|---|---|---|
| CN | 105488318 A | 4/2016 |
| EP | 3605334 A1 | 2/2020 |
| WO | 2020025633 A1 | 2/2020 |

OTHER PUBLICATIONS

Tatarenko, "Stochastic Learning in Potential Games: Communication and Payoff-Based Approaches," in arXiv preprint arXiv: 1804. 04403 (2018). (Year: 2018).*

Chatterjee et al., "On Nash Equilibria in Stochastic Games," in Int'l Workshop on Computer Sci. Logic 26-40 (2004). (Year: 2004).*

Zhang et al., "Multi-Agent Reinforcement Learning: A Selective Overview of Theories and Algorithms," arxiv.org, Cornell University Library, 201 Olin Library Cornell University Ithaca, NY 14853, XP081538764, pp. 1-72 (Nov. 24, 2019).

Macua et al., "Learning Parametric Closed-Loop Policies for Markov Potential Games," Published as a conference paper at ICLR 2018, total 16 pages (May 22, 2018).

Wang et al.,"A Game-Theoretic Learning Framework for Multi-Agent Intelligent Wireless Networks," arxiv.org, Cornell University Library, 201 Olin Library Cornell University Ithaca, NY 14853, XP080988745, pp. 1-8 (Dec. 4, 2018).

Zazo et al., "Dynamic Potential Games With Constraints: Fundamentals and Applications in Communications," IEEE Transactions on Signal Processing, vol. 64, No. 14, pp. 3806-3821, Institute of Electrical and Electronics Engineers, New York, New York (Jul. 15, 2016).

* cited by examiner $$[T_\phi F](s) := \sup_{a \in \mathcal{A}} \left[ \phi(s, a) + \gamma \int_{s' \in \mathcal{S}} P(s'; a, s) F[s'] \right], \quad \forall s \in \mathcal{S}$$

Figure 2

Theorem 1. *Denote by $NE(\mathcal{G})$ the set of NE for the game $\mathcal{G}$, then there exists a measurable function $B : S \times \Pi \to \mathbb{R}$ we have that*

*i)* $\pi^* \in \arg\sup_{\pi' \in \Pi} B^{\pi'} \implies \pi^* \in NE(\mathcal{G}),$

*ii)* $\lim_{k \to \infty} T_\phi^k B = B^{\pi^*}$

*hence the optimum in joint strategies of $v$ is a MP-NE of the game $\mathcal{G}$.*

Figure 3

$$\min_{F\in\mathscr{F}} J(F), \; J(F) := \left\| \mathbb{E}_\pi \left[ \frac{\partial}{\partial \eta^i} \ln \pi_{\theta,\lambda}(a^i|s;\eta^i)| \left( \frac{\partial R_\lambda(s,a^i,a^{-i})}{\partial u^i} - \frac{\partial F(s,a^i,a^{-i})}{\partial u^i} \right) \right] \right\|^2_{E\times S,\rho} \quad (7)$$

where $\|f(y)\|^2 = \int_{\mathcal{Y}} |f(y)|^2 \nu(y) dy$ where $\nu(y)$ is a positive probability density on a Banach space $\mathcal{Y}$.

Figure 4

Define by $\quad \iota(s,\eta,\rho) \quad := \quad \sum_{i\in\mathscr{I}} g^i(s,\eta,\rho) \quad$ where $\quad g^i(s,\eta,\rho) \quad :=$ $\pi_{\theta,\lambda}(a^i|s;\eta^i)\pi_{\theta,\lambda}\left( a^{-i}|s;\eta^{-i}\right) \frac{\partial}{\partial \eta^i} \ln \pi_{\theta,\lambda}(a^i|s;\eta^i)| \left( \frac{\partial R_\lambda(s,a^i,a^{-i})}{\partial u^i} - \frac{\partial P_\rho(s,a^i,a^{-i})}{\partial u^i} \right),$ Lastly define by $g^2(s,\eta,\cdot) := \sum_{i\in\mathscr{I}} |g^i(s,\eta,\rho)|^2$

Figure 5 minimise $G(s,\rho) = N^{-1} \sum_{i\in\mathscr{I}} \left( g^i(s,\rho) \right)^2$, s.t., $\rho^i - z = 0, \quad i = 1, \ldots, N$, where, given some step size $\alpha > 0$, our gradient descent iteration obeys the following: $\rho^i_n =$ $\rho^i_{n-1} - \alpha \nabla g^i(s,\rho), \forall i \in \mathscr{I}$

Figure 6

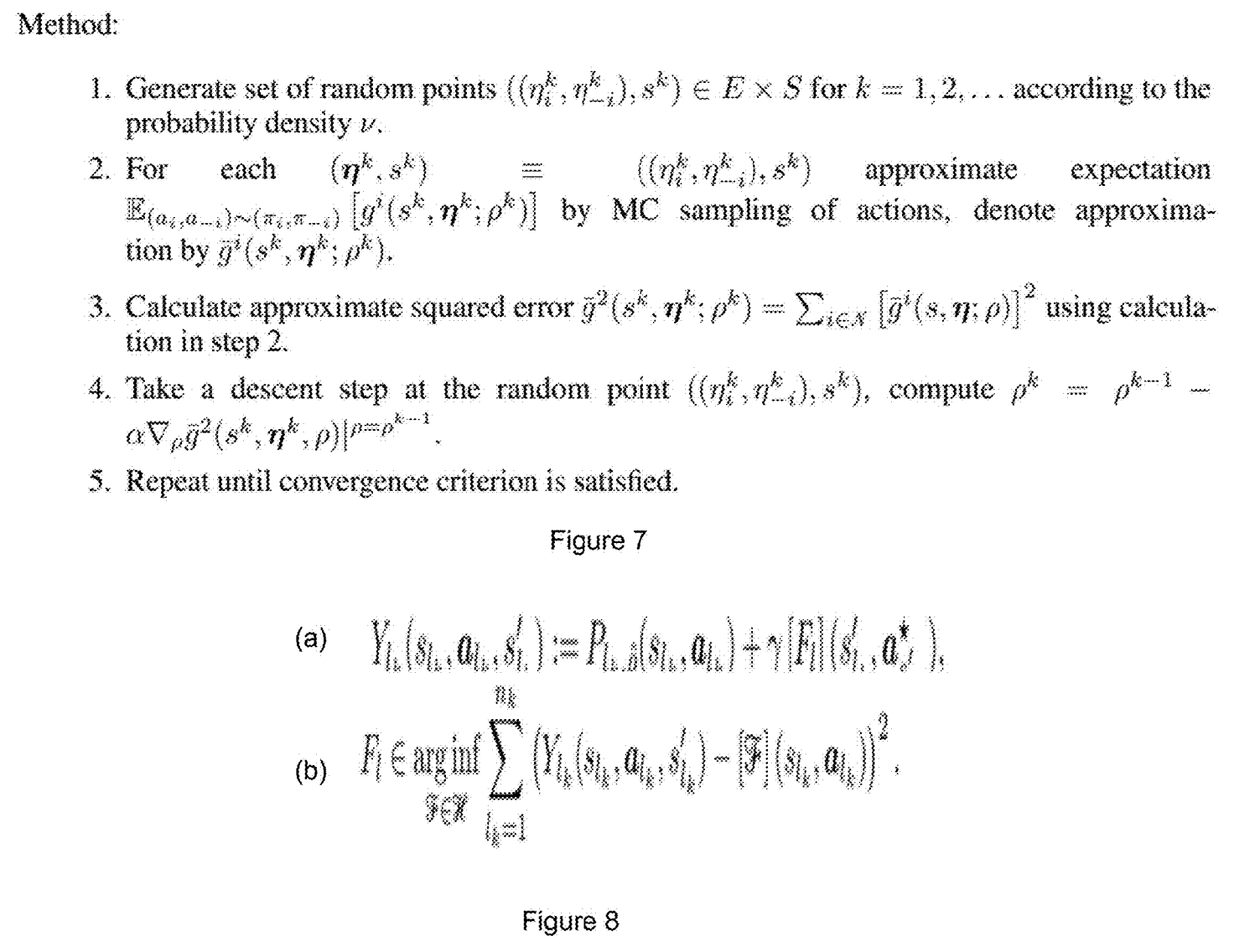

Method:

1. Generate set of random points $((\eta_i^k, \eta_{-i}^k), s^k) \in E \times S$ for $k = 1, 2, \ldots$ according to the probability density $\nu$.

2. For each $(\eta_i^k, s^k)$ approximate expectation $\mathbb{E}_{(a_i, a_{-i}) \sim (\pi_i, \pi_{-i})}[g^i(s^k, \eta^k; \rho^k)]$ by MC sampling of actions, denote approximation by $\bar{g}^i(s^k, \eta^k; \rho^k)$.

3. Calculate approximate squared error $\bar{g}^2(s^k, \eta^k; \rho^k) = \sum_{i \in \mathcal{N}} [\bar{g}^i(s, \eta; \rho)]^2$ using calculation in step 2.

4. Take a descent step at the random point $((\eta_i^k, \eta_{-i}^k), s^k)$, compute $\rho^k = \rho^{k-1} - \alpha \nabla_\rho \bar{g}^2(s^k, \eta^k; \rho)|_{\rho = \rho^{k-1}}$.

5. Repeat until convergence criterion is satisfied.

Figure 7

(a)   $Y_{i,k}(s_{i,k}, a_{i,k}, s_i') := R_{i,k}(s_{i,k}, a_{i,k}) + \gamma [\Pi](s_{i,k}', a_i^*)$, (b)   $\Pi_i^* \in \arg\inf_{g \in \mathcal{G}} \sum_{k=1}^{n_i} \left( Y_{i,k}(s_{i,k}, a_{i,k}, s_{i,k}') - [g](s_{i,k}, a_{i,k}) \right)^2$.

Figure 8

Figure 9:
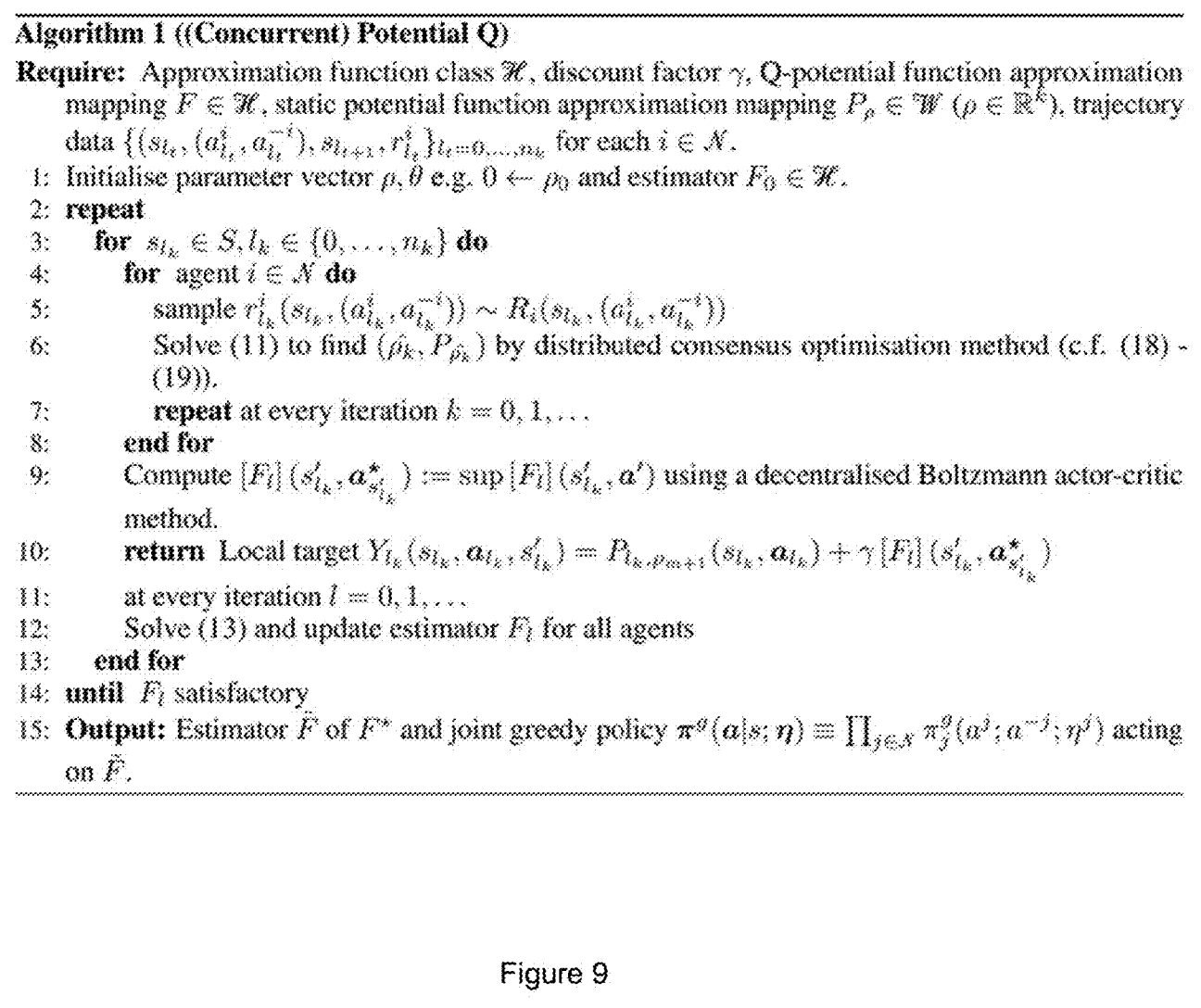

Algorithm 1 ((Concurrent) Potential Q)

Require: Approximation function class $\mathcal{H}$, discount factor $\gamma$, Q-potential function approximation mapping $F \in \mathcal{H}$, static potential function approximation mapping $P_\rho \in \mathcal{W}$ ($\rho \in \mathbb{R}^c$), trajectory data $\{(s_{i_k}, (a^i_{i_k}, a^{-i}_{i_k}), s_{i_k+1}, r^i_{i_k})\}_{i_k=0,\dots,n_k}$ for each $i \in \mathcal{N}$.

1: Initialise parameter vector $\rho, \theta$ e.g. $0 \leftarrow \rho_0$ and estimator $F_0 \in \mathcal{H}$.
2: repeat
3:   for $s_{i_k} \in S, i_k \in \{0,\dots,n_k\}$ do
4:     for agent $i \in \mathcal{N}$ do
5:       sample $r^i_{i_k}(s_{i_k}, (a^i_{i_k}, a^{-i}_{i_k})) \sim R_i(s_{i_k}, (a^i_{i_k}, a^{-i}_{i_k}))$
6:       Solve (11) to find $(\rho_k, P_{\rho_k})$ by distributed consensus optimisation method (c.f. (18) - (19)).
7:       repeat at every iteration $k = 0, 1, \dots$
8:     end for
9:     Compute $[F_l](s^i_{i_k}, a^*_{q_{i_k}}) := \sup [F_l](s^i_{i_k}, a^i)$ using a decentralised Boltzmann actor-critic method.
10:    return Local target $Y_{i_k}(s_{i_k}, a_{i_k}, s^i_{i_k}) = P_{k, \rho_{m+1}}(s_{i_k}, a_{i_k}) + \gamma [F_l](s^i_{i_k}, a^*_{q_{i_k}})$
11:    at every iteration $l = 0, 1, \dots$
12:    Solve (13) and update estimator $F_l$ for all agents
13:  end for
14: until $F_l$ satisfactory
15: Output: Estimator $\hat{F}$ of $F^*$ and joint greedy policy $\pi^q(a|s; \eta) := \prod_{j\in S} \pi^q_j(a^j; a^{-j}, \eta^j)$ acting on $\hat{F}$.

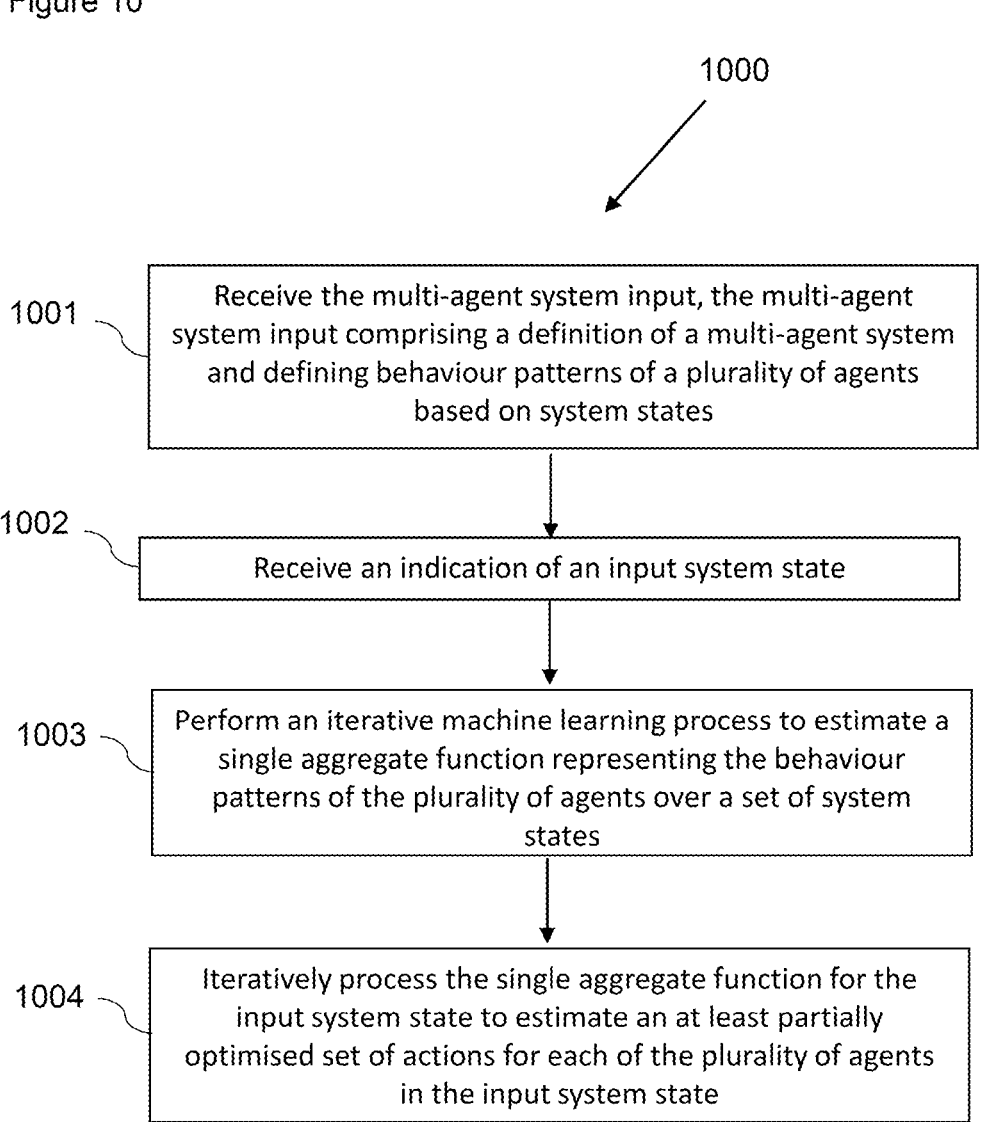

1000

1001 — Receive the multi-agent system input, the multi-agent system input comprising a definition of a multi-agent system and defining behaviour patterns of a plurality of agents based on system states 1002 — Receive an indication of an input system state 1003 — Perform an iterative machine learning process to estimate a single aggregate function representing the behaviour patterns of the plurality of agents over a set of system states 1004 — Iteratively process the single aggregate function for the input system state to estimate an at least partially optimised set of actions for each of the plurality of agents in the input system state

Figure 11:
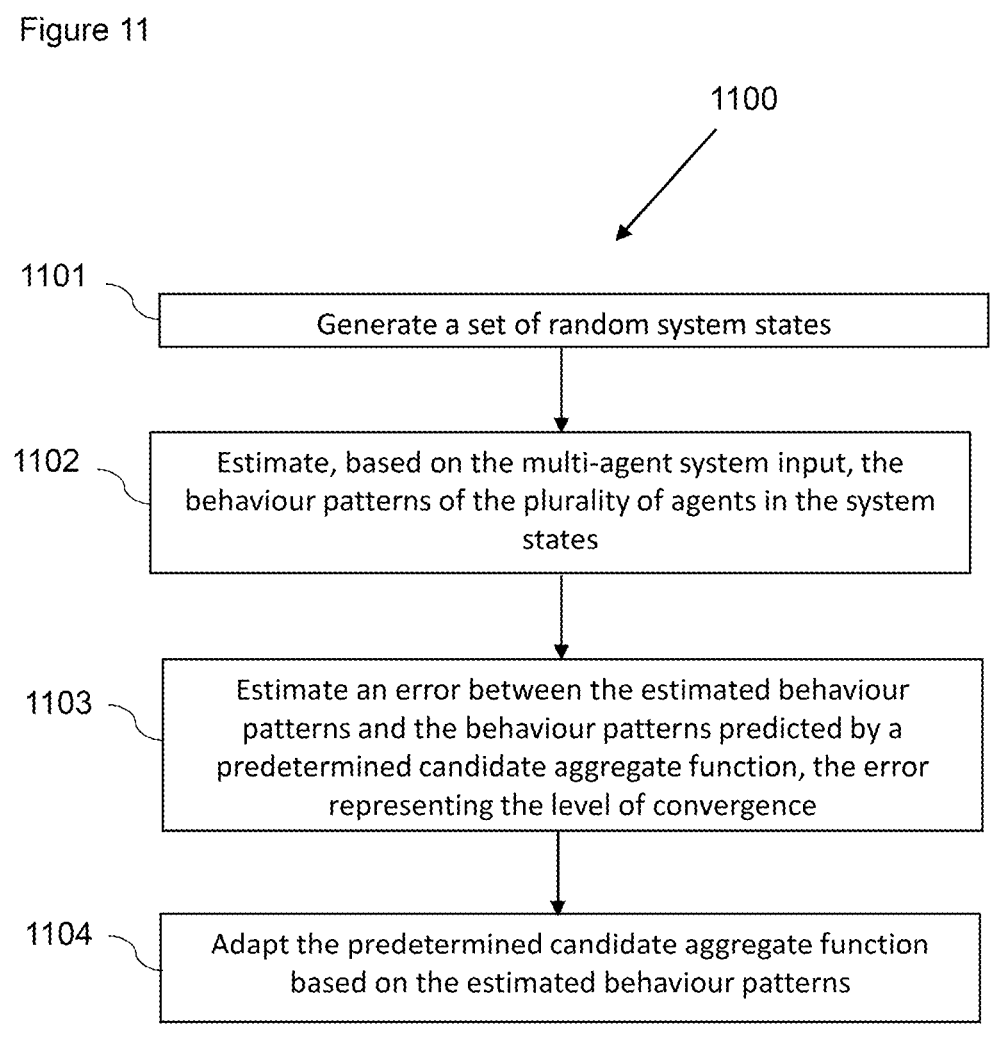

| Generate a set of random system states |
| --- |

1102

| Estimate, based on the multi-agent system input, the behaviour patterns of the plurality of agents in the system states |
| --- |

1103

| Estimate an error between the estimated behaviour patterns and the behaviour patterns predicted by a predetermined candidate aggregate function, the error representing the level of convergence |
| --- |

1104

| Adapt the predetermined candidate aggregate function based on the estimated behaviour patterns |
| --- |

Figure 13

A game $G = (N, A = A_1 \times \ldots \times A_N, u : A \to \mathbb{R}^N)$ is:

- an exact potential game if there is a function $\Phi : A \to \mathbb{R}$ such that $\forall a_{-i} \in A_{-i}, \forall a_i', a_i'' \in A_i$, $$\Phi(a_i', a_{-i}) - \Phi(a_i'', a_{-i}) = u_i(a_i', a_{-i}) - u_i(a_i'', a_{-i})$$

That is: when player $i$ switches from action $a'$ to action $a''$, the change in the potential equals the change in the utility of that player.

- a weighted potential game if there is a function $\Phi : A \to \mathbb{R}$ and a vector $w \in \mathbb{R}_{++}^N$ such that $\forall a_{-i} \in A_{-i}, \forall a_i', a_i'' \in A_i$, $$\Phi(a_i', a_{-i}) - \Phi(a_i'', a_{-i}) = w_i(u_i(a_i', a_{-i}) - u_i(a_i'', a_{-i}))$$

- an ordinal potential game if there is a function $\Phi : A \to \mathbb{R}$ such that $\forall a_{-i} \in A_{-i}, \forall a_i', a_i'' \in A_i$, $$u_i(a_i', a_{-i}) - u_i(a_i'', a_{-i}) > 0 \Leftrightarrow \Phi(a_i', a_{-i}) - \Phi(a_i'', a_{-i}) > 0$$

- a generalized ordinal potential game if there is a function $\Phi : A \to \mathbb{R}$ such that $\forall a_{-i} \in A_{-i}, \forall a_i', a_i'' \in A_i$, $$u_i(a_i', a_{-i}) - u_i(a_i'', a_{-i}) > 0 \Rightarrow \Phi(a_i', a_{-i}) - \Phi(a_i'', a_{-i}) > 0$$

- a best-response potential game if there is a function $\Phi : A \to \mathbb{R}$ such that $\forall i \in N, \forall a_{-i} \in A_{-i}$, $$b_i(a_{-i}) = \arg\max_{a_i \in A_i} \Phi(a_i, a_{-i})$$

where $b_i(a_{-i})$ is the best action for player $i$ given $a_{-i}$.

Discrete congestion games are games with the following components.

- A base set of congestible elements $E$;
- $n$ players;
- A finite set of strategies $S_i$ for each player, where each strategy $P \in S_i$ is a subset of $E$;
- For each element $e$ and a vector of strategies $(P_1, P_2, \ldots, P_n)$, a load $x_e = \#\{i : e \in P_i\}$;
- For each element $e$, a delay function $d_e : \mathbb{N} \longrightarrow \mathbb{R}$;
- Given a strategy $P_i$, player $i$ experiences delay $\sum_{e \in P_i} d_e(x_e)$. Assume that each $d_e$ is positive and monotone increasing.

NON-ZERO-SUM GAME SYSTEM FRAMEWORK WITH TRACTABLE NASH EQUILIBRIUM SOLUTION

CROSS-REFERENCE TO RELATED APPLICATIONS

This application is a continuation of International Application No. PCT/EP2020/065456, filed on Jun. 4, 2020, the disclosure of which is hereby incorporated by reference in its entirety.

FIELD OF THE INVENTION

Embodiments of this invention relate to multi-agent machine learning systems.

BACKGROUND

Multi-agent systems generally comprise a plurality of self-interested agents, actors or players that strategically interact. These settings are described by mathematical frameworks known as games. In these settings, each agent reasons about the environment and the actions of other agents to decide on actions that maximise their own reward.

The goal of multi-agent reinforcement learning (MARL) is to compute a set of optimal decision rules for each agent known as best-response policies which describe how agents ought to act when in a shared environment with other agents. The environment undergoes changes according to some dynamics which are affected by the agents' actions and may have a random component (stochasticity). Executing best-response policies ensures that an individual agent obtains the highest rewards it can (i.e. maximises its performance), given the behaviour of all other agents.

Computing the strategic configuration in which all agents are executing their best-response actions is difficult because of the interdependencies between each of the agents' actions. In particular, a desirable configuration is known as a fixed point. This is a configuration in which no agent can improve their payoff by unilaterally changing their current policy behaviour. This concept is known as a Nash equilibrium (NE).

The NE is central concept for understanding and making predictions about the behaviour of such multi-agent systems. Therefore, the task of solving multi-agent systems relies on computing the NE of a strategic framework or game. Despite its relevance in understanding multi-agent systems, the task of computing the NE of multi-agent systems that describe real-world scenarios can be challenging. Notable issues are that the instability of a system of learners who update their policies produces a nonstationary appearance for other agents. A second issue is the exponential explosion in complexity with the number of agents, since joint action learners require the joint action as an input to compute their own best response. Another issue is fundamental to stochastic games (SGs). Even without learning, in general there are no available methods to compute Nash equilibria for SGs.

General multi-agent systems which are a priori unknown generally cannot be solved using MARL. Existing solutions of such Nash equilibrium refer to extreme circumstances, such as fully competitive (in which all agents have diametrically opposed goals) and fully cooperative (in which all agents have the same goals). These circumstances are usually far away from reality in physical systems. This is as a consequence of the fact that without a known structure to represent the problem tractably, the problem lies in a complexity class known as Polynomial Parity Arguments on Directed graphs (PPAD) which prohibits brute force and exhaustive search solution methods. Therefore, deploying MARL algorithms in settings that depart in any, possibly small, way from these settings generally results in poor tractability in computing the NE for even moderately sized systems with both no convergence guarantees and poor performance.

The more general case in which the agents' goals are neither diametrically opposed nor perfectly aligned may not be solved with MARL. Consequently, the task of solving multi-agent systems that represent many real-world systems may remain beyond the reach of traditional MARL methods. In fact, even if the system is known, such systems can traditionally only be solved tractably for two agents using linear programming methods, such as the Lemke-Howson algorithm. However, in addition to being generally restricted to two-player games in which all aspects of the system are known, the Lemke-Howson algorithm cannot solve dynamic (multi-stage) or stochastic problems in which the agents perform multiple actions and the game transitions between states.

Many methods for multi-agent machine learning, such as those described in U.S. Pat. No. 8,014,809B2 and CN105488318A, are only able to deal with static, one-time actions in fully known systems. In other known methods, U.S. Pat. No. 6,961,678B2 describes an approach using cooperative game theory to resolve statistical and other joint effects. CN102413473A describes cooperative game-based frequency spectrum allocation method in a cognitive sensor network cluster. CN101296190B describes cooperative communication mode based on game theory in wireless ad hoc network. In EP3605334A1, a hierarchical Markov game framework uses Bayesian optimisation for finding optimal incentives.

The approach described in Macua, Sergio Valcarcel, Javier Zazo, and Santiago Zazo. "Learning Parametric Closed-Loop Policies for Markov Potential Games", arXiv preprint arXiv:1802.00899, ICLR 2018, provides theoretical conditions for a Markov game to be an Markov Potential Game, and shows the equivalence between finding closed-loop NE in Markov Potential Game and solving a single-agent optimal control problem. This method imposes very restrictive assumptions on the interactions between agents and does not account for unknown environments.

The approach described in B. Zazo, Santiago, et al. "Dynamic potential games with constraints: Fundamentals and applications in communications", IEEE Transactions on Signal Processing 64.14 (2016): 3806-3821, concerns dynamic potential games, whose solution can be found through a single multivariate optimal control problem. The set of environments' states and the set of players' actions are constrained. The setting only considers deterministic transitions with no learning method or algorithm for computing the solution. The method therefore is not applicable to unknown systems or with systems with randomness or future uncertainty. Restrictive assumptions are imposed on the interaction between agents which imply that only "nearby" agents can affect each other's performance.

It is desirable to develop an improved method for developing multi-agent machine learning systems that overcomes these problems.

SUMMARY OF THE INVENTION

According to one aspect there is provided a computer-implemented device for processing a multi-agent system input to form an at least partially optimised output indicative of an action policy, the device comprising one or more processors configured to perform the steps of: receiving the multi-agent system input, the multi-agent system input comprising a definition of a multi-agent system and defining behaviour patterns of a plurality of agents based on system states; receiving an indication of an input system state; performing an iterative machine learning process to estimate a single aggregate function representing the behaviour patterns of the plurality of agents over a set of system states; and iteratively processing the single aggregate function for the input system state to estimate an at least partially optimised set of actions for each of the plurality of agents in the input system state.

This may allow a set of agents to interact with an unknown environment and may allow policies corresponding to the Nash equilibrium to be learned.

The step of performing an iterative machine learning process may comprise repeatedly performing the following steps until a predetermined level of convergence is reached: generating a set of random system states; estimating based on the multi-agent system input the behaviour patterns of the plurality of agents in the system states; estimating an error between the estimated behaviour patterns and the behaviour patterns predicted by a predetermined candidate aggregate function, the error representing the level of convergence; and adapting the predetermined candidate aggregate function based on the estimated behaviour patterns. This can enable the system to find a suitable aggregate function in a manageable time period.

The set of random system states may be generated based on a predetermined probability distribution. This can improve the speed of convergence and/or the effectiveness of the aggregate function.

The error may be estimated as between derivatives of the estimated behaviour pattern and the behaviour patterns. This may allow convergence to be effectively estimated.

The error may be estimated as the sum of the squares of the differences between estimated behaviour patterns and respective behaviour patterns predicted by the candidate aggregate function. This may allow convergence to be effectively estimated.

The single aggregate function may be formed so that maxima of the aggregate function yield a behaviour pattern that corresponds to a solution of a stochastic potential game. This may improve the solubility of the relationships.

The at least partially optimised output may comprise a collectively optimal action policy for of the plurality of agents in the input system state. This can be helpful in enabling agent behaviour to be subsequently modelled.

The at least partially optimised output may represent Nash equilibrium behaviour pattern of the agents in the input system state. This can represent a highly optimised model of agent behaviour.

The agents may be autonomous vehicles and the system states may be vehicular system states. This may allow the device to be implemented in a driverless car.

The agents may be communications routing devices and the system states may be data flows. This may allow the device to be implemented in a communication system.

The agents may be data processing devices and the system states may be computation tasks. This may allow the device to be implemented in data processing applications.

The aggregate function may be such as to jointly maximise rewards of the agents over a set of system states. This can result in efficient operation of multiple agents.

According to a second aspect there may be provided a method for processing a multi-agent system input to form an at least partially optimised output indicative of an action policy, the method comprising the steps of: receiving the multi-agent system input, the multi-agent system input comprising a definition of a multi-agent system and defining behaviour patterns of a plurality of agents based on system states; receiving an indication of an input system state; performing an iterative machine learning process to estimate a single aggregate function representing the behaviour patterns of the plurality of agents over a set of system states; and iteratively processing the single aggregate function for the input system state to estimate an at least partially optimised set of actions for each of the plurality of agents in the input system state.

The method may further comprise the step of causing each of the actors to implement a respective action of the at least partially optimised set of actions. In this way the method can be used to control the actions of a physical entity.

According to a third aspect there is computer readable medium storing in non-transient form a set of instructions for causing one or more processors to perform the method described above. The method may be performed by a computer system comprising one or more processors programmed with executable code stored non-transiently in one or more memories.

BRIEF DESCRIPTION OF THE FIGURES

The present invention will now be described by way of example with reference to the accompanying drawings. In the drawings:

FIG. 2 defines the Bellman operator $[T_\phi F](s)$.

FIG. 3 shows a theorem (Theorem 1), whereby the optimum in joint strategies of $\nu$ is a MP-NE of the game $\mathcal{G}$. Theorem 1 may allow the SG $\mathcal{G}$ to be solved by constructing a dual MDP.

FIG. 4 shows an example of an optimization that may be solved in order to find the MDP.

FIG. 5 shows a definition whereby $\eta_i$ ($\eta_{-i}$) is the parameter for the agent i (agent −i) policy, where the meaning of agent −i is all other agents except agent i. $\rho$ represents an optimisation variable for over a parameterisation of a given function.

FIG. 6 shows a least squares fitting problem with optimisation variable $\rho$.

FIG. 7 shows an example of a method used to compute the reward function $\phi$ for the MDP $\langle \phi, \times_{i \in \mathcal{N}} \mathcal{A}_i, P, S, \gamma \rangle$.

FIGS. 8A and 8B show qualities which can be used to solve the SPG. Theorem 1 shown in FIG. 3 suggests that approximate dynamic programming, i.e. a Q-learning style algorithm, can be used to compute an approximate B function and corresponding optimal policy for each agent. Firstly, the quantity shown in FIG. 8A is defined. At every iteration k=0, 1 . . . , the minimisation shown in FIG. 8B is performed.

FIG. 9 shows an example of an algorithm describing the workflow of the method.

FIG. 10 summarises a method for processing a multi-agent system input to form an at least partially optimised output indicative of an action policy.

FIG. 11 summarises an example of the process performed as part of the step of performing an iterative machine learning process.

FIG. 13 shows some non-limiting examples of the properties of the reward function of each agent in a multi-agent system that are compatible with the approach described herein.

DETAILED DESCRIPTION

Described herein is a computer implemented device and method for application in multi-agent machine learning systems.

Figure 1:
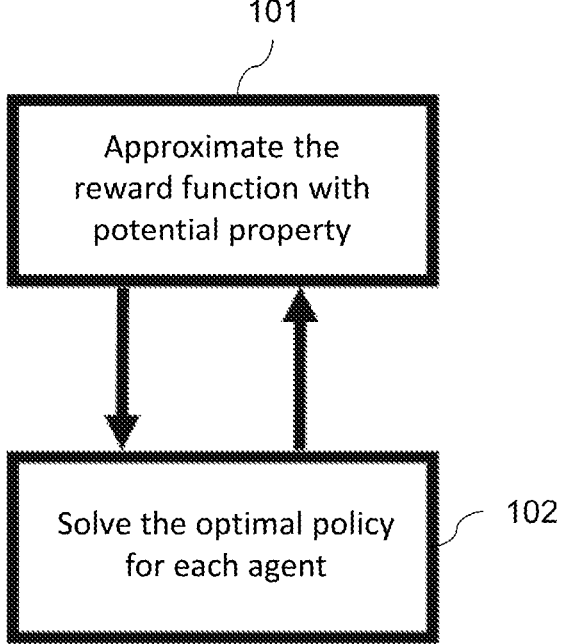
FIG. 1 schematically illustrates an overview of a two-step approach in a multi-agent system to solve a general-sum multi-player game where the first step aims to approximate the reward function with potential property and the second step aims to solve the optimal policy for each agent, given the learned potential function.

As illustrated in FIG. 1, the approach described herein is a two-step process in the multi-agent system to solve a general-sum multi-player game where a first step (shown at 101) aims to approximate the reward function by learning a single aggregate function (potential function) and a second step (shown at 102) aims to solve the optimal policy for each agent given the learned function.

In general, the computer-implemented device is configured to process a multi-agent system input to form an at least partially optimised output indicative of an action policy. The device is configured to receive the multi-agent system input, which comprises a definition of a multi-agent system and defines behaviour patterns of a plurality of agents based on system states (for example, if the system state is X, the agent performs the action Y). The behaviour patterns may be policies. The device is also configured to receive an indication of an input system state. The input system state may be considered to be the system state of interest. In a preferred implementation, this is the system state that it is desired to solve the Nash equilibrium for. In practice, where the agents are physical actors, the input system state may be considered to be the current state of the physical system in which they act.

The device is configured to perform an iterative machine learning process to estimate a single aggregate function (also referred to herein as a potential function) representing the behaviour patterns of the plurality of agents over a set of system states. This may involve producing estimates of the potential function calculated by each agent which are shared in a consensus step which aggregates the estimate.

In one implementation, a gradient-based method that modifies reward functions and the probability transition functions is used to form different system states in which the behaviour patterns of the agents can be evaluated.

The device iteratively processes the learned potential function for the input system state to estimate an at least partially optimised set of actions for each of the plurality of agents in the input system state. The device may update the potential function in response to feedback based on the behaviour patterns of the agents in each system state.

During initialisation, a predetermined candidate potential function may be associated with the input system state and may be received by the device. In a preferred implementation, the device is configured to generate a set of random system states and estimate the behaviour patterns of the plurality of the agents in each of the system states. The device may update the candidate potential function by estimating an error between the estimated behaviour patterns and the behaviour patterns predicted by the predetermined candidate potential function, the error representing the level of convergence and adapting the predetermined candidate potential function based on the estimated behaviour patterns. The device may perform these steps repeatedly until a predetermined level of convergence is reached, thus indicating the end of the training process.

Each of the resulting action policies may be at least partially optimal. The predetermined level of convergence may be based on (and the at least partially optimised output may represent) the Nash equilibrium behaviour pattern of the agents in the input system state.

The mathematical formalism of the approach described herein is supported by theory that generalises a class of games that describe static multi-agent settings. In particular, the theory generalises a class of games, known as potential games (PG), to now cover stochastic settings with continuous action and state spaces.

The method described herein converts the representation of the system from a stochastic game (SG) into a stochastic potential game (SPG) representation. After, the task of solving, the system can be transformed into an equivalent problem of solving a Markov decision process (MDP). This is a well-known decision problem which can be solved tractably. Without performing the aforementioned conversion, the problem lies in a generic space which cannot be solved tractably. In particular, the conversion allows the problem of solving the multi-agent system to be converted from finding a fixed point Nash equilibrium which previous to the current invention did not admit a representation as an optimisation problem.

The MDP lies within a computational complexity class known as P-SPACE which means that the problem can be computed tractably (specifically in polynomial time). In particular, the optimisation problem is to find an optimal joint policy of an MDP which is a priori unknown. Since the goal is to obtain the optimal policies for all agents, the MDP must be solved. Solving (unknown) MDPs is well understood and there are a number of available methods to tackle the problem.

In order to determine the specific MDP, in the approach described herein a sequence of steps may be performed which receives, after interaction with the environment, a set of observations of rewards and state transitions from which the MDP formulation is constructed using an application of supervised learning methods. All conversions to the specific MDP have a common characteristic, namely that they can be solved based on a computable optimization methods. Thereafter, the method obtains the (MDP). The solutions of the MDP are shown by way of theory to coincide with the MP-NE of the SPG.

Therefore, the aforementioned conversion enables standard methodologies to be used to solve the subsequent MDP and recover the NE policies. In an unknown setting, that is, where the aspects of the MDP (system) are a priori unknown, the body of methods to solve the unknown MDP is known as reinforcement learning (RL) which involves training agents in an unknown system to learn the optimal behaviour for each agent. After solving the unknown MDP, the system outputs policies that enable the agents to make best decisions pertaining to ongoing developments based on learned knowledge of the system.

Examples of the approach will now be described in more detail.

Potential games (PG) are a class of games that are commonly used to model various real-world scenarios. The following definitions may be applied.

A stage game $\mathcal{M}$ (s) is an (exact) PG if there exists a measurable function $\phi$: $S \times \mathcal{A} \to \mathbb{R}$ such that the following holds for any $$(a_i, a_{-i}), (a'_i a_{-i}) \in A,$$

$\forall i \in \mathcal{N}$, $\forall s_t \in S$:

$$R_i\left(s_t, \left(a_t^i, a_t^{-i}\right)\right) - R_i\left(s_t, \left(a_t'^i a_t^{-i}\right)\right) = \phi\left(s_t, \left(a_t^i, a_t^{-i}\right)\right) - \phi\left(s_t, \left(a_t'^i a_t^{-i}\right)\right) \text{ where}$$

$$a_t^{-i} := \left(a_t^1, \ldots a_t^{i-1}, a_t^{i+1}, \ldots, a_t^N\right).$$

This condition says that the difference in payoff induced by a single deviation by one of the players is exactly quantified by a difference in a function $\phi$, a function over state and joint actions. A SPG is a SG in which this condition is fulfilled at each state. In order to describe the stable outcome in a SG, the following variant of the Nash equilibrium is adopted which is appropriate for SGs with Markov transitions:

A strategy profile $$\pi^* = (\pi_i^*, \pi_{-i}^*) \in \prod$$

is a Markov perfect Nash equilibrium (MP-NE) in Markov strategies if the following condition holds for any $i \in \mathcal{N}$:

$$v_i^{\left(\pi_i^*, \pi_{-i}^*\right)}(s) \geq v_i^{\left(\pi_i', \pi_{-i}^*\right)}(s), \forall s \in S, \forall \pi_i' \in \prod_i$$

This condition characterizes strategic configurations in which at any state no player can improve their expected cumulative rewards by unilaterally deviating from their current strategy.

The Bellman operator $[T_\phi F](s)$ is defined as shown in FIG. 2. According to Theorem 1, as shown in FIG. 3, the optimum in joint strategies of v is a MP-NE of the game $\mathcal{G}$. In fact, as demonstrated in the proof of the theorem, any MP-NE is a local optimum of the function B. Theorem 1 allows the SG $\mathcal{G}$ to be solved by constructing a dual MDP $\langle \phi, \mathcal{A}, \times_{i \in \mathcal{N}} {}_i, P, S, \gamma \rangle$. As is demonstrated below, the SG $\mathcal{G}$ can be solved by computing the solution to a distributed MDP (team game) (4), $\mathcal{A} \langle, \phi, \{\mathcal{N}_i\}_{i \in \mathcal{N}}, P, S, \gamma \rangle$.

In this game, all agents share the same goal and the potential function $\phi$ represents the global team reward. As described below, an algorithm may also tackle the general case which works firstly by constructing successive estimates of M based on sample data. This may involve producing estimates of $\phi$ calculated by each agent which are shared in a consensus step which aggregates the estimate. At each iteration, the solution to each iteration may be computed in a fully distributed fashion.

In further detail, a SG, $\mathcal{G}$, is a SG for which each stage game $\mathcal{M}$ (s) is a PG for any $s \in S$. SPGs generalize PGs to the dynamic setting with Markovian transitions. An SG is an augmented MDP which proceeds by two or more players taking actions that jointly manipulate the transitions of a system over $T \in \mathbb{N}$ time steps, which may be infinite. At each time step, the players receive some immediate reward or cost which is a function of the players' current joint actions and the current state. In a SG, at a given time, the players simultaneously play one of many possible stage games $\mathcal{M}$ which are indexed by states that lie within some state space S. The outcome of each stage game $\mathcal{M}$ (s) depends on the joint actions executed by the players where $$a_s^i \in \mathcal{A}_i$$

is the action taken by player $i \in \mathcal{N}$, $s \in S$ is the state of the world and $\mathcal{A}_i$ is the action set for player i.

Formally, consider an SG defined by a tuple $\mathcal{G} = \langle \mathcal{N}, \mathcal{S}, (\mathcal{A}_i)_{i \in \mathcal{N}}, P, (R_i)_{i \in \mathcal{N}}, \gamma \rangle$ where $\mathcal{N} := \{1, \ldots, N\}$ is the set of players for some $N \in \mathbb{N}$, $\mathcal{S}$ is a finite set of states, $\mathcal{A}_i$ is an action set for each player $i \in \mathcal{N}$ and the function $R_i: \mathcal{S} \times \mathcal{A} \to \mathbb{R}$ is the one-step reward for player i. The map P: $\mathcal{S} \times \mathcal{A} \times \mathcal{S} \to [0, 1]$ is a Markov transition probability matrix, i.e. $P_\theta(s'|s, a_s)$ is the probability of the state s' being the next state given the system is in state s and the joint action $a_s \in \mathcal{A}$ is played.

Therefore, the SG proceeds as follows: given some stage game $\mathcal{M}$ (s)=$\langle (\mathcal{A}_i, )_{i \in \mathcal{N}}, (R_i)_{i \in \mathcal{N}}, \mathcal{N} \rangle$, the players simultaneously execute a joint action $$a_s := \left(a_s^1, a_s^2, \ldots, a_s^N\right) \in \mathcal{A}$$

and immediately thereafter, each player $i \in \mathcal{N}$ receives a payoff $R_i(s, a_s)$, the state then transitions to $s' \in S$ with probability $P(s'|s, a_s)$ where the game $\mathcal{M}$ (s') is played in which the players receive a reward discounted by $\gamma$.

Now, each player employs a parameterised policy $\pi_i \in \Pi_{i,\eta^i}$ to decide its action at $s \in \mathcal{S}$ where $\eta^i \in \mathbb{R}^q$. For an SG, $\mathcal{G}$, the goal of each player $i \in \mathcal{N}$ is to determine a policy $\pi_{i,\eta^i}(\theta) \in \Pi_i$ that maximizes the quantity below:

$$v_i^{\pi_i, \pi_{-i}}(s) = \mathbb{E}_{\pi_i, \pi_{-i}, s_t \sim P}\left[\sum_{t \geq 0} \gamma^t R_i(s_t, a_t) \mid s_0 = s\right]$$

Where convenient, the shorthand $$f^{\left(\pi_i^i \pi^{-i}\right)}(s) = \mathbb{E}_{\pi_i, \pi_{-i}}\left[f\left(s, a_s^i, a_s^{-i}\right)\right]$$

may be used for any measurable function $\forall s \in S$, $\forall \pi_i \in \Pi_i$, $\forall \pi_{-i} \in \Pi_{-i}$ and where $i \in \mathcal{N}$.

In order to find the MDP, the optimisation shown in FIG. 4 is solved.

In the definition shown in FIG. 5, $\eta_i(\eta_{-i})$ is the parameter for the agent i (agent −i) policy where the meaning of agent −i is all other agents except agent i. Recall also that the set of agents $\{1, 2, \ldots N\}$ is denoted by $\mathcal{N}$. Bold symbols denote the collection for example $\eta = (\eta_i, \ldots, \eta_N)$. In the definition shown in FIG. 5, $\rho$ represents an optimisation variable for over a parameterisation of a given function. Using the weighted (exponential) sum method leads to the least squares fitting problem shown in FIG. 6 with optimisation variable $\rho$. The objective is expressed in terms of a collection of local variables $\{\rho_i\}_{i \in \mathcal{N}}$ and a common global variable z.

The method to compute the function $\phi$ for the MDP $\langle \phi, \times_{i \in \mathcal{N}} \mathcal{A}_i, P, S, \gamma \rangle$ is as shown in FIG. 7. The algorithm of FIG. 7 generates an approximation for the function that solves the optimisation in FIG. 4 which approximates $\phi$. Function approximators may be used, for example a deep neural network. The output of the algorithm is denoted by $P_\rho$ where $\rho$ is a parameter that is optimised to fulfil the optimisation shown in FIG. 4.

In the following, F is used to denote some function which is unknown. This is not to be confused with the function F in FIG. 4. In the following section, a Q-learning method is explained which is used to solve the MDP. In the method described herein, the optimisation of P and F is performed concurrently. The function P is therefore endowed with two sub indices. The two sub indices denote the iteration step for the optimisation of P.

In order to solve the SPG, as suggested by Theorem 1 shown in FIG. 3, approximate dynamic programming, i.e. a Q-learning style algorithm, can now be used to compute an approximate B function and corresponding optimal policy for each agent. Firstly, the quantity shown in FIG. 8A is defined. At every iteration k=0, 1 . . . , the minimisation shown in FIG. 8B is performed. The algorithm constructs an estimate for the dual team game RL problem $\langle (R_i)_{i \in \mathcal{N}} = \phi, \mathcal{A}_i, P, S, \gamma \rangle$ whose joint solution corresponds to the MP-NE of $\mathcal{G}$. The dual problem is solved in a distributed fashion, in which case the problem becomes a team game setting.

The exemplary algorithm shown in FIG. 9 works by each agent solving the current stochastic team game approximation i.e. the solution to each RL problem is computed in a distributed fashion and at each step the estimates of $\phi$ calculated by each agent are shared in a consensus step to form a single function. This single function is such as to jointly maximise rewards of the agents over a set of system states. The exemplary algorithm performs the two optimizations concurrently, therefore speeding up the convergence. To decentralize the computation in step 8, each agent independently computes its own solution to the team game $\mathcal{G}(s) = \langle \mathcal{N}, F_k, (\mathcal{A}_i)_{i \in \mathcal{N}} \rangle$, in which the goal of each agent is to maximize the function $F_k$. In one particular implementation, the agents may use an actor-critic method to compute their best-response action for $\mathcal{G}(s)$. With this adjustment, the algorithm removes the need to perform any optimizations over any joint space, specifically $\times_{i \in \mathcal{N}} \mathcal{A}_i$. The joint greedy policy, which is the output in line 15 of the algorithm shown in FIG. 9, is the Nash equilibrium policy.

Embodiments of the present invention allow a set of agents to interact with an unknown environment. Specifically, the agents perform actions in a dynamic environment. Each agent may receive as its input an observation of the environment described by the system state and each agent signals on their individual performance by way of a metric known as rewards or payoff. This step is known as training. The reward signal from a given joint action (that is, action from all agents) is then represented internally by each agent device. This representation is converted by the agent to a form which enables the agents to update their actions in manner prescribed by the algorithm so as to iterate towards the best-response Nash equilibrium behavior.

The method described herein is a two-step process in the multi-agent system to solve a general-sum multi-player game where the first step aims to approximate the reward function with a potential property and the second step aims to solve the optimal policy for each agent, given the learned potential function.

The two-level hierarchical system framework described herein may include, but is not limited to including, the following. The first step may use machine learning methods to learn the potential function, such as support vector machines, and neural networks. The second step may use reinforcement learning to solve the optimal policy for each agent, including but not limited to q-learning and value iteration. The method may therefore use a decentralised technique which is based on q-learning, but the computation is distributed among all agents. An advantage of this relative to other methods is that this may assist in scaling with large population systems.

This setting may enable control of a multi-agent system under the condition that the system and interactions between agents can be described as a stochastic potential game.

FIG. 10 summarises an example of a computer-implemented method 1000 for processing a multi-agent system input to form an at least partially optimised output indicative of an action policy. At step 1001, the method comprises receiving the multi-agent system input, the multi-agent system input comprising a definition of a multi-agent system and defining behaviour patterns of a plurality of agents based on system states. At step 1002, the method comprises receiving an indication of an input system state. At step 1003, the method comprises performing an iterative machine learning process to estimate a single aggregate function representing the behaviour patterns of the plurality of agents over a set of system states. At step 1004, the method comprises iteratively processing the single aggregate function for the input system state to estimate an at least partially optimised set of actions for each of the plurality of agents in the input system state.

FIG. 11 summarises an example of the process performed as part of the step of performing an iterative machine learning process. The process comprises repeatedly performing the following steps until a predetermined level of convergence is reached. At step 1101, the method comprises generating a set of random system states. At step 1102, the method comprises estimating based on the multi-agent system input the behaviour patterns of the plurality of the agents in the system states. At step 1103, the method comprises estimating an error between the estimated behaviour patterns and the behaviour patterns predicted by a predetermined candidate aggregate function, the error representing the level of convergence. At step 1104, the method comprises adapting the predetermined candidate aggregate function based on the estimated behaviour patterns.

Figure 12:
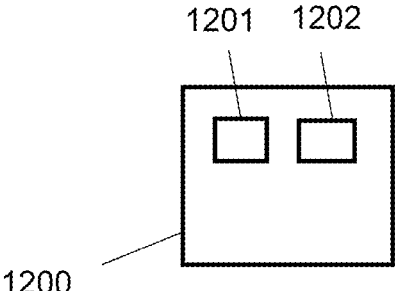
FIG. 12 shows a schematic diagram of a computer system configured to implement the method described herein and some of its associated components.

FIG. 12 shows a schematic diagram of a computer system 1200 configured to implement the computer implemented method described above and its associated components. The system may comprise a processor 1201 and a non-volatile memory 1202. The system may comprise more than one processor and more than one memory. The memory may store data that is executable by the processor. The processor may be configured to operate in accordance with a computer program stored in non-transitory form on a machine readable storage medium. The computer program may store instructions for causing the processor to perform its methods in the manner described herein.

Implementations of the method described herein may solve at least the following problems.

Embodiments of the present invention may solve a problem of computing solutions to multi-agent systems with self-interested agents that are described by (a priori unknown) nonzero-sum stochastic games. For the systems, the agents' interaction need not be perfectly adversarial, nor are they required to act as a team (however these cases are also covered). In this sense, a problem solved by embodiments of the present invention is solving Nash equilibrium strategies that offer a better fit with most physical systems.

In particular, the method may provide a solver that allows independent RL agents to learn their Nash equilibrium (best-response) strategies in systems with populations of self-interested RL agents. Additionally, the method may be applied to multi-agent settings in which the agents' actions are drawn from a continuous set and in settings with continuous state spaces. This enables a number of physical systems to be described with better precision relative to discrete descriptions.

The approach described herein has several advantages over prior art methods. For example, in contrast to the approach in U.S. Pat. No. 6,961,678B2, which applies a fully-cooperative game framework, the framework applied herein generalizes the fully-cooperative game but may still enable a tractable Nash equilibrium solution. Furthermore, many approaches, such as those described in U.S. Pat. No. 8,014,809B2 and CN105488318A, can only deal with static, one-time actions in fully known systems. The approach described herein may be applied to much more general settings in which the nodes of the network can fulfil their own goals and in which agents perform sequences of actions.

Examples of applications of this approach include but are not limited to: driverless cars/autonomous vehicles, unmanned locomotive devices, packet delivery and routing devices, computer servers and ledgers in blockchains. For example, the agents may be autonomous vehicles and the system states may be vehicular system states. The agents may be communications routing devices and the system states may be data flows. The agents may be data processing devices and the system states may be computation tasks.

Embodiments of the present invention enable control of a multi-agent system under the condition that the system and interactions between agents can be described as a stochastic potential game. Some further non-limiting examples of the properties of the reward function of each agent in a multi-agent system that are compatible with and may be implemented in the approach described herein are shown in FIG. 13.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A computer-implemented device for processing a multi-agent system input to form an at least partially optimized output indicative of an action policy, the device comprising one or more processors configured to perform the following:

receiving the multi-agent system input, the multi-agent system input comprising a definition of a multi-agent system and defining behavior patterns of a plurality of agents based on system states, wherein the plurality of agents are driverless cars controlled by the device;

receiving an indication of an input system state from one or more sensors of the driverless cars;

performing an iterative machine learning process to estimate a single aggregate function representing the behavior patterns of the plurality of agents over a set of system states, wherein a representation of the multi-agent system is converted from a nonzero-sum stochastic game (SG) representation into a stochastic potential game (SPG) representation; and iteratively processing the single aggregate function for the input system state to estimate an at least partially optimized set of actions for each of the plurality of agents in the input system state, wherein the multi-agent system is transformed into an equivalent Markov decision process (MDP), including receiving, after interaction with an environment, a set of observations of rewards and state transitions based on which the MDP is decided using an application of supervised learning methods; and wherein the MDP is for estimating the at least partially optimized set of actions for each of the plurality of agents in the input system state; and sending controlling signals indicating the at least partially optimized set of actions to the one or more sensors of the driverless cars, so that the driverless cars carry out respective actions of the at least partially optimized set of actions.

2. The device according to claim 1, wherein the performing the iterative machine learning process comprises repeatedly performing the following until a predetermined level of convergence is reached:

generating a set of random system states;

estimating, based on the multi-agent system input, the behavior patterns of the plurality of agents in the system states;

estimating an error between the estimated behavior patterns and the behavior patterns predicted by a predetermined candidate aggregate function, the error representing a level of convergence; and adapting the predetermined candidate aggregate function based on the estimated behavior patterns.

3. The device according to claim 2, wherein the set of random system states are generated based on a predetermined probability distribution.

4. The device according to claim 2, wherein the error is estimated as between derivatives of the estimated behavior pattern and the behavior patterns.

5. The device according to claim 2, wherein the error is estimated as a sum of squares of differences between estimated behavior patterns and respective behavior patterns predicted by the candidate aggregate function.

6. The device according to claim 1, wherein the single aggregate function is formed so that maxima of the aggregate function yield a behavior pattern that corresponds to a solution of the SPG.

7. The device according to claim 1, wherein the at least partially optimized output comprises a collectively optimal action policy for the plurality of agents in the input system state.

8. The device according to claim 1, wherein the at least partially optimized output represents Nash equilibrium behavior pattern of the agents in the input system state.

9. The device according to claim 1, wherein the agents are autonomous vehicles and the system states are vehicular system states.

10. The device according to claim 1, wherein the agents are communications routing devices and the system states are data flows.

11. The device according to claim 1, wherein the agents are data processing devices and the system states are computation tasks.

12. The device according to claim 1, wherein the aggregate function includes jointly maximizing rewards of the agents over a set of system states.

13. A method for processing a multi-agent system input to form an at least partially optimized output indicative of an action policy, the method which is performed by a computer-implemented device comprising:

receiving the multi-agent system input, the multi-agent system input comprising a definition of a multi-agent system and defining behavior patterns of a plurality of agents based on system states, wherein the plurality of agents are driverless cars controlled by the device;

receiving an indication of an input system state from one or more sensors of the driverless cars;

performing an iterative machine learning process to estimate a single aggregate function representing the behavior patterns of the plurality of agents over a set of system states, wherein a representation of the multi-agent system is converted from a nonzero-sum stochastic game (SG) representation into a stochastic potential game (SPG) representation; and iteratively processing the single aggregate function for the input system state to estimate an at least partially optimized set of actions for each of the plurality of agents in the input system state, wherein the multi-agent system is transformed into an equivalent Markov decision process (MDP), including receiving, after interaction with an environment, a set of observations of rewards and state transitions based on which the MDP is decided using an application of supervised learning methods; and wherein the MDP is for estimating the at least partially optimized set of actions for each of the plurality of agents in the input system state; and sending controlling signals indicating the at least partially optimized set of actions to the one or more sensors of the driverless cars, so that the driverless cars carry out respective actions of the at least partially optimized set of actions.

14. The method according to claim 13, further comprising: causing each of the agents to implement a respective action of the at least partially optimized set of actions.

15. A non-transitory computer readable medium storing in non-transient form a set of instructions for causing one or more processors of a computer-implemented device to perform a method for processing a multi-agent system input to form an at least partially optimized output indicative of an action policy, the method comprising:

receiving the multi-agent system input, the multi-agent system input comprising a definition of a multi-agent system and defining behavior patterns of a plurality of agents based on system states, wherein the plurality of agents are driverless cars controlled by the device;

receiving an indication of an input system state from one or more sensors of the driverless cars;

performing an iterative machine learning process to estimate a single aggregate function representing the behavior patterns of the plurality of agents over a set of system states, wherein a representation of the multi-agent system is converted from a nonzero-sum stochastic game (SG) representation into a stochastic potential game (SPG) representation; and iteratively processing the single aggregate function for the input system state to estimate an at least partially optimized set of actions for each of the plurality of agents in the input system state, wherein the multi-agent system is transformed into an equivalent Markov decision process (MDP), including receiving, after interaction with an environment, a set of observations of rewards and state transitions based on which the MDP is decided using an application of supervised learning methods; and wherein the MDP is for estimating the at least partially optimized set of actions for each of the plurality of agents in the input system state; and sending controlling signals indicating the at least partially optimized set of actions to the one or more sensors of the driverless cars, so that the driverless cars carry out respective actions of the at least partially optimized set of actions.

16. The non-transitory computer readable medium according to claim 15, wherein the method further comprises: causing each of the agents to implement a respective action of the at least partially optimized set of actions.

17. The non-transitory computer readable medium according to claim 15, wherein the performing the iterative machine learning process comprises repeatedly performing the following until a predetermined level of convergence is reached:

generating a set of random system states;

estimating, based on the multi-agent system input, the behavior patterns of the plurality of agents in the system states;

estimating an error between the estimated behavior patterns and the behavior patterns predicted by a predetermined candidate aggregate function, the error representing a level of convergence; and adapting the predetermined candidate aggregate function based on the estimated behavior patterns.

18. The non-transitory computer readable medium according to claim 17, wherein the set of random system states are generated based on a predetermined probability distribution.

19. The non-transitory computer readable medium according to claim 17, wherein the error is estimated as between derivatives of the estimated behavior pattern and the behavior patterns.

20. The non-transitory computer readable medium according to claim 17, wherein the error is estimated as a sum of squares of differences between estimated behavior patterns and respective behavior patterns predicted by the candidate aggregate function.

\* \* \* \* \*